United States Patent [19]
Ishida

[11] Patent Number: 6,051,901
[45] Date of Patent: Apr. 18, 2000

[54] MOTOR UNIT FITTED WITH BUFFER MECHANISM

[75] Inventor: Toshihiko Ishida, Anjo, Japan

[73] Assignee: Aisin Seiki Kabushiki Kaisha, Kariya, Japan

[21] Appl. No.: 09/161,594

[22] Filed: Sep. 28, 1998

[30] Foreign Application Priority Data

Sep. 26, 1997 [JP] Japan .................................. 9-262443

[51] Int. Cl.[7] .................................................. H02K 7/06
[52] U.S. Cl. ................................ 310/83; 310/83; 49/280; 49/310; 292/301; 292/337; 464/66; 464/160; 343/903; 343/715; 343/766
[58] Field of Search ................................ 310/83; 49/280, 49/310, 303, 306; 292/301, 337; 464/66, 61, 160; 343/903, 901, 715, 766

[56] References Cited

U.S. PATENT DOCUMENTS

| | | | |
|---|---|---|---|
| 3,988,891 | 11/1976 | Hoyler | 60/288 |
| 4,748,865 | 6/1988 | Umezawa et al. | 74/411 |
| 4,885,954 | 12/1989 | Wanlass | 74/625 |
| 5,106,133 | 4/1992 | Fukumoto et al. | 292/201 |
| 5,173,716 | 12/1992 | Tetsuka | 343/903 |
| 5,190,499 | 3/1993 | Mori et al. | 464/36 |
| 5,259,261 | 11/1993 | Michel | 74/425 |
| 5,267,482 | 12/1993 | Yoshida et al. | 74/425 |
| 5,570,103 | 10/1996 | Tetsuka | 343/903 |
| 5,653,144 | 8/1997 | Fenelon | 74/411 |
| 5,692,410 | 12/1997 | Fenelon | 74/411 |
| 5,787,755 | 8/1998 | Periou et al. | 74/411 |

FOREIGN PATENT DOCUMENTS 4-134723  8/1992  Japan .
7-18864  1/1995  Japan .

*Primary Examiner*—Nestor Ramirez
*Assistant Examiner*—Thanh Lam
*Attorney, Agent, or Firm*—Burns, Doane, Swecker & Mathis, LLP

[57] ABSTRACT

A motor unit fitted with a buffer mechanism which absorbs the turning force of a motor when an output shaft of the motor stops due to an external load while the motor is operative and which can provide stable performance without causing biting between a worm and a worm wheel. The motor unit fitted with the buffer mechanism causes relative rotation between the output shaft and the worm wheel when the output shaft stops turning while the motor is operative. Springs and rubbers are provided in series or in parallel in a power transmission system within the worm wheel with respect to the direction of rotation of the worm wheel so as to function as buffer members by absorbing the turning force of the motor when the output shaft stops turning while the motor is operative.

16 Claims, 4 Drawing Sheets

MOTOR UNIT FITTED WITH BUFFER MECHANISM

CROSS-REFERENCE TO RELATED APPLICATION

This application corresponds to and claims priority under 35 U.S.C. § 119 with respect to Japanese Application No. 09(1997)-262443 filed on Sep. 26, 1997, the entire content of which is incorporated herein by reference.

BACKGROUND OF THE INVENTION

1. Field of the Invention

The present invention relates to a motor unit fitted with a buffer mechanism, and more particularly, to a buffer mechanism for absorbing a turning force of the motor when an output system of the motor stops while the motor is still operating.

2. Description of Related Art

Hitherto, in the field of pinch detection for vehicles, there has been known a pinch detector comprising a worm provided around a rotary shaft of a motor, a worm wheel engaging with the worm, an output shaft for transmitting the rotation of the motor to the outside, a plate member which turns in a body with the output shaft and a spring disposed between the plate member and the worm wheel.

When the worm provided around the rotary shaft of the motor turns, the worm wheel turns along with the turn of the worm, the plate member is pressed by the urging force of the spring disposed within the worm wheel and the output shaft turns, in a body with the plate member. Thus, this apparatus actuates an external apparatus such as a window regulator for opening/closing a glass window or a sun-roof opening system.

For instance, Japanese Utility Model Publication No. Hei. 7-18864 discloses a pinch detector in which the spring flexes and causes relative rotation between the worm wheel and the output shaft when the turn of the output shaft connected to the external apparatus is stopped, while the motor is operative, due to pinching of an object or the like, i.e., when pinch occurs.

Further, as another pinch detector, Japanese Patent Laid-Open No. Hei. 4-134723 discloses an apparatus in which hard rubber is provided between the worm wheel and the output shaft. This causes relative rotation between the worm wheel engaging the worm provided around the rotary shaft of the motor and the output shaft connected to the sun-roof opening system when a pinch occurs. When the output shaft stops while the motor is operative, the rubber functions as a buffer member for buffering a turning force of the motor. Thus, it prevents the teeth of the worm and the worm wheel from chipping in the engagement when the rotation of the motor is locked and when the motor torque is large, including the case when a pinch occurs.

However, although the spring has a linear stress characteristic and can cause the relative rotation between the worm wheel and the output shaft through the urging force thereof when the pinch occurs, regardless of changes of temperature, as can other springs, as shown, for example, in Japanese Utility Model Publication No. Hei. 7-18864, springs do not have enough energy absorbing ability for suppressing the rotation of the motor and cannot therefore be used as a buffer member when the pinch occurs.

Thus, although the turning force of the motor may be stably absorbed when the pinch occurs, or when the motor is locked, by using the spring in the pinch detector, the spring is unable to deal with creep fracture of the tooth surface between the worm and the worm wheel.

Further, although it is possible to fully absorb the turning force of the motor when rubber is used as shown in Japanese Patent Laid-Open No. Hei. 4-134723, because the rubber is hard it exhibits hysteresis (non-linear characteristics) peculiar to rubber when it is stretched/contracted (when resilient/compressed) and the reaction force of the rubber decreases from its original reaction as time elapses (fatigue of rubber).

Accordingly, when rubber is used in the pinch detector, the force applied to the tooth surface decreases when successive force is applied to the tooth surface between the worm and the worm wheel. Therefore, although it is possible to prevent the creep fracture of the tooth surface when the worm wheel used is made of resin because the force applied to the tooth surface decreases, the reaction force thereof becomes unstable generally immediately after being released after having once been compressed, as when a pinch occurs for example. That is, the reaction force is unstable when the window of a vehicle in the closed state is opened and then immediately closed.

SUMMARY OF THE INVENTION

Accordingly, it is an object of the present invention to solve the above-mentioned problems by providing a motor unit which has a buffer mechanism for fully absorbing an output of the motor when an output shaft connected to an external apparatus stops while the motor is operative and which substantially prevents biting or creep fracture between a worm and a worm wheel due to the stable buffer mechanism.

The present invention solves the above-mentioned problems, by providing a motor unit fitted with a buffer mechanism comprising a worm provided around a rotary shaft of a motor; a worm wheel which engages with the worm; an output shaft for transmitting a turning force of the motor to the outside; a plate member which rotates in a body with the output shaft; and elastic members disposed between the plate member and the worm wheel. The elastic members flex and cause relative rotation between the output shaft and the worm wheel when the output shaft stops turning while the motor is operative. The elastic members include springs and rubbers and the springs and the rubbers are provided in series or in parallel with respect to the direction of rotation of the worm wheel.

By constructing a buffer mechanism as described above, the turning force of the motor is absorbed by the springs and rubbers, which also cause the relative rotation between the output shaft and the worm wheel. The springs and rubbers are provided in series or in parallel in a dynamic transmission path (dynamic transmission system) with respect to the direction of rotation of the worm wheel such that should the output shaft which is linked to an external apparatus stop while the motor is operative, i.e., when pinch occurs, the springs and rubbers function as buffer members. Further, because the turning force of the motor may also be absorbed by the springs and rubbers, biting between the worm and the worm wheel is minimal.

The springs and rubbers may be accommodated within the worm wheel, thus requiring only the size and space limitations set by the worm wheel, and being further advantageous space-wise, by adopting coil springs as the springs, by disposing the rubbers within the coil springs and by disposing the coil springs and rubbers within grooves created within the worm wheel.

The turning force of the motor may be absorbed only by the coil springs when the load of the motor is light, at the time when pinch occurs, by setting the length of the rubber to be shorter than the length of the respective coil spring disposed within the worm wheel. Thereafter, the turning force of the motor may be additionally absorbed by the compressive force of the rubbers as the load increases.

That is, the load may be shared efficiently by the coil springs and rubbers and the stress to the tooth surface may be changed at the point of time of changing over from the flex of the coil spring to the compression of the coil spring plus rubber by arranging the rubber so as to start to be compressed in the vicinity of the position where the coil spring is thoroughly flexed when the output shaft stops to turn. As a result, stress applied to the tooth surface between the worm and the worm wheel may be reduced and it becomes possible to suppress biting between the worm and the worm wheel. That is, it is possible to prevent creep deformation of the worm wheel and to suppress the biting by reducing the resulting stress on the tooth surface as the stress of the rubber decreases when the coil spring and rubber are flexed by the maximum output of the motor.

In this case, the coil spring and the rubber can absorb the output of the motor and function as sufficient buffer members in the state wherein the coil spring is not set, even when the output of the motor is maximum, by arranging the coil spring and rubber so as to be compressible even when the output of the motor is maximum.

Further, the spring may be assembled favorably and provides stable performance even when flexed by using a circular arc coil spring as the coil spring because it achieves face-to-face contact within the worm wheel.

The specific nature of the invention, as well as other objects and advantages thereof, will clearly appear from the following description and from the accompanying drawings in which like numerals refer to like parts.

BRIEF DESCRIPTION OF THE DRAWING FIGURES

DESCRIPTION OF THE PREFERRED EMBODIMENTS

One embodiment of the present invention will be explained below with reference to the drawings. It is noted that although a motor unit 1 fitted with a buffer mechanism and applied to a window regulator 20 for moving up/down a window glass 30 of a vehicle will be shown here as the illustrated example, the inventive motor unit is not limited only to such applications and may also be applied to sun-roof systems and the like.

Figure 4:
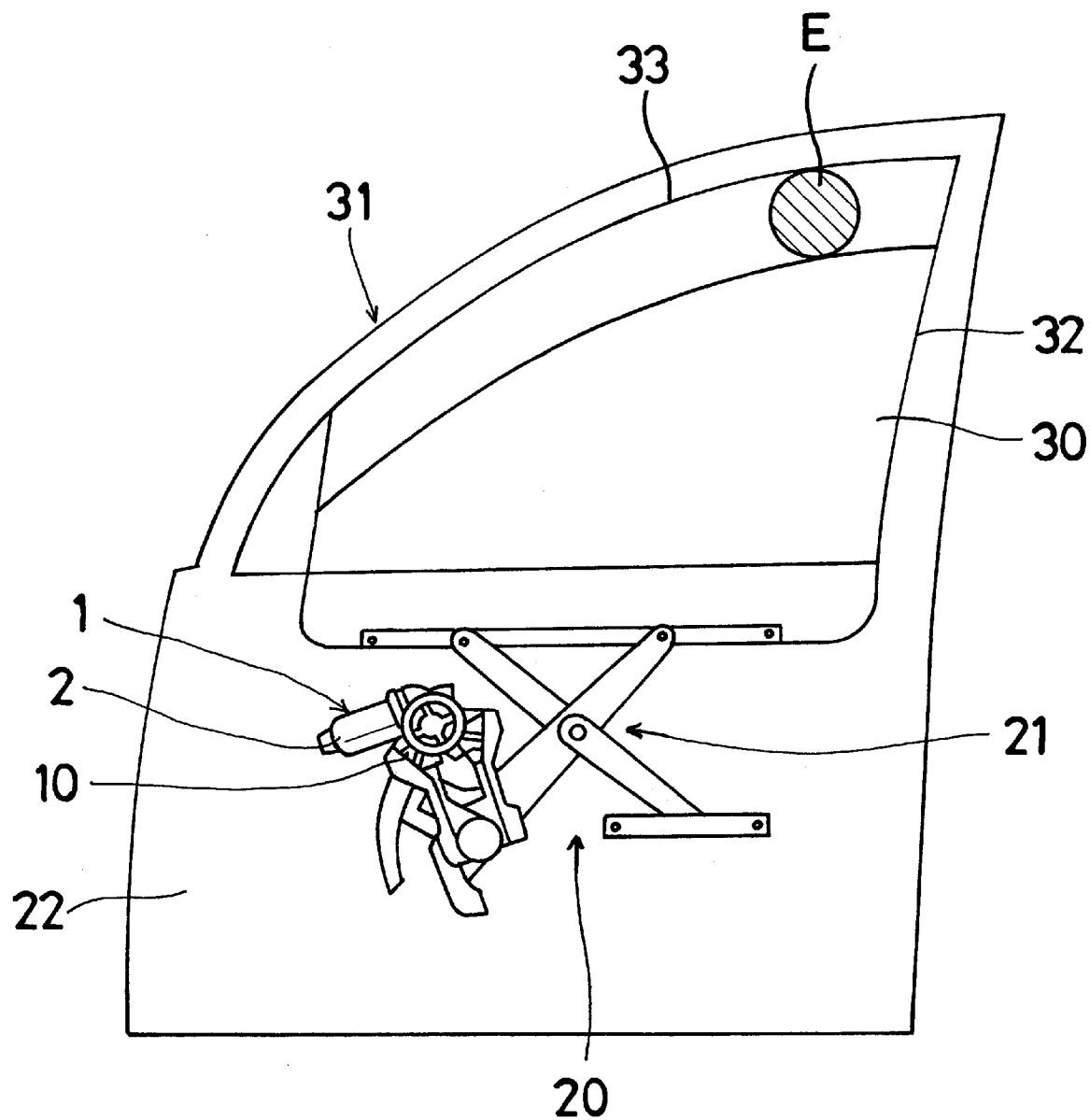
FIG. 4 is a plan view showing the relationship between the inventive motor unit and a window regulator.

A power window of a vehicle or the like shown in FIG. 4 is what moves up/down the window glass 30 along guide rails (window frames) 32 and 33 by using the power of a motor 2 and X-shaped arms 21. While there is also a wire type window regulator that could be used, the X-type link mechanism will be explained here. In the unit having the X-type link mechanism, upper ends of the X-type link mechanism 21 are fixed to a lower edge portion of the window glass 30. One arm at the lower edge portions of the link mechanism is fixed to a door panel 22 and the other arm is linked to the motor unit 1. The window glass 30 may be moved up/down by flexing the window regulator 20 by actuating the motor 2.

Lately, for the sake of safety, a mechanism for stopping the upward motion of the window glass 30 while absorbing the turning force of the motor and for reversing the motion to the downward motion when a hand or an object is pinched between the window glass 30 and the guide rails 32 and 33 when the window glass 30 is rising has been added to such an arrangement.

Figure 1:
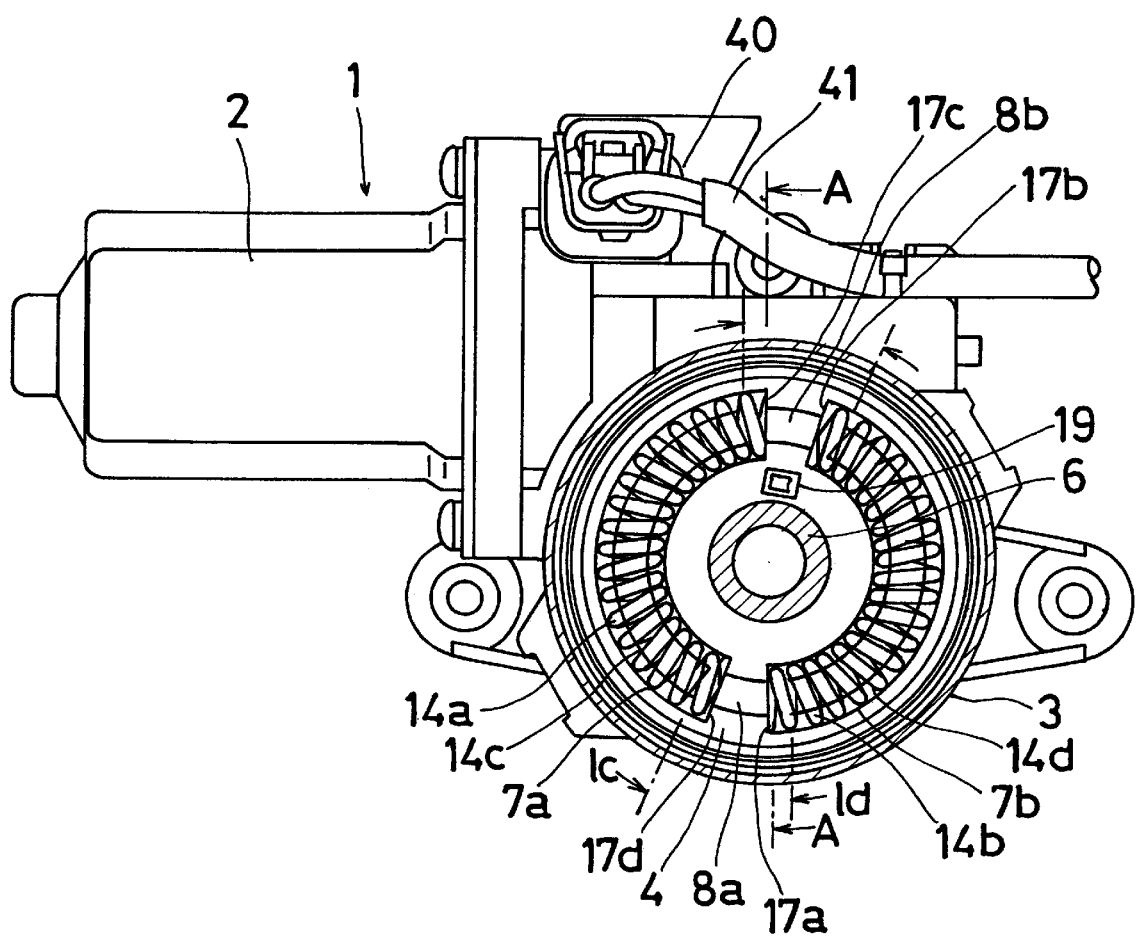
FIG. 1 is a section view showing the main part of a buffer mechanism of a motor unit according to one embodiment of the present invention.
Figure 2:
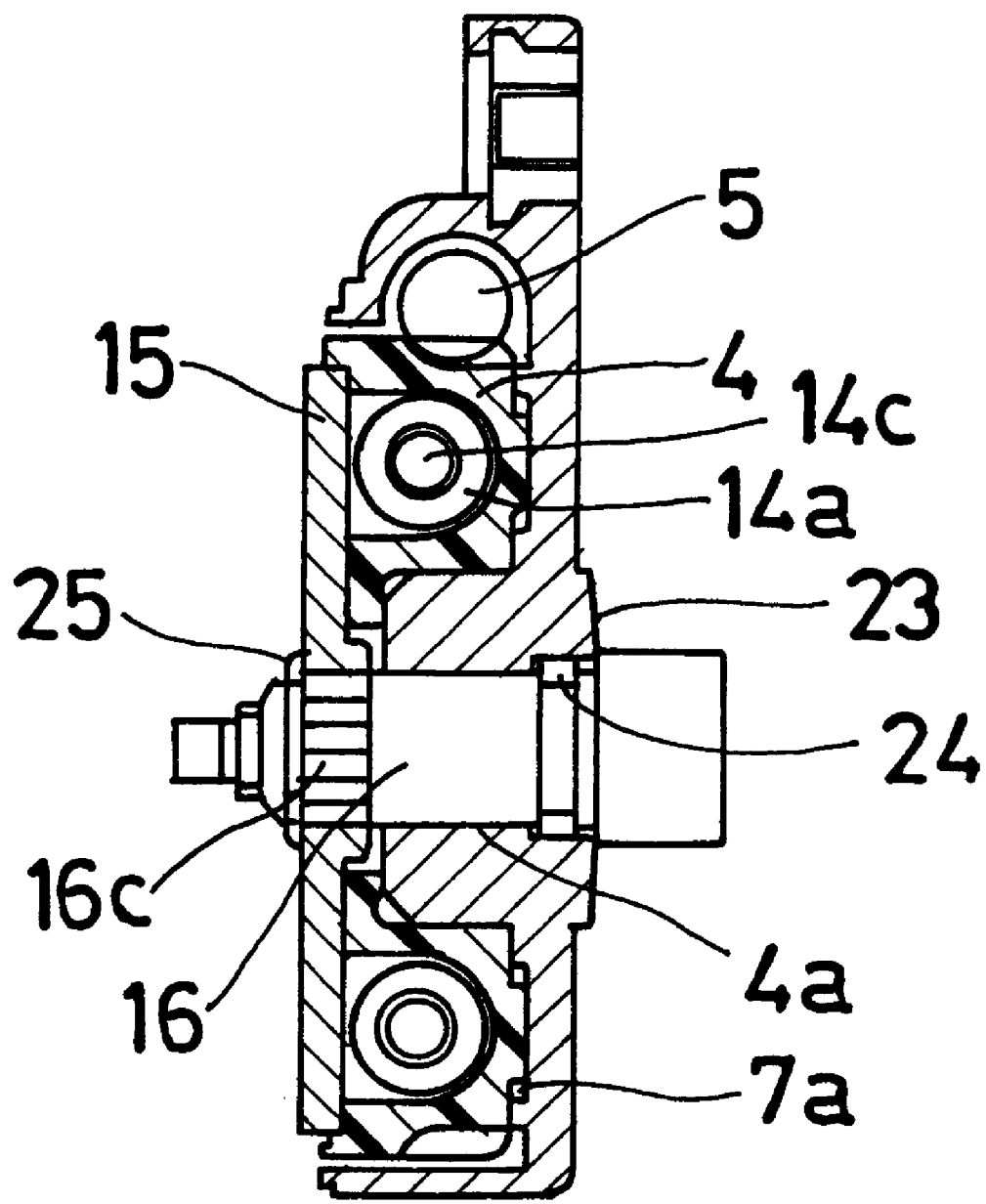
FIG. 2 is a section view along A—A in FIG. 1 in which a connector for feeding electricity to the motor is removed.
Figure 3:
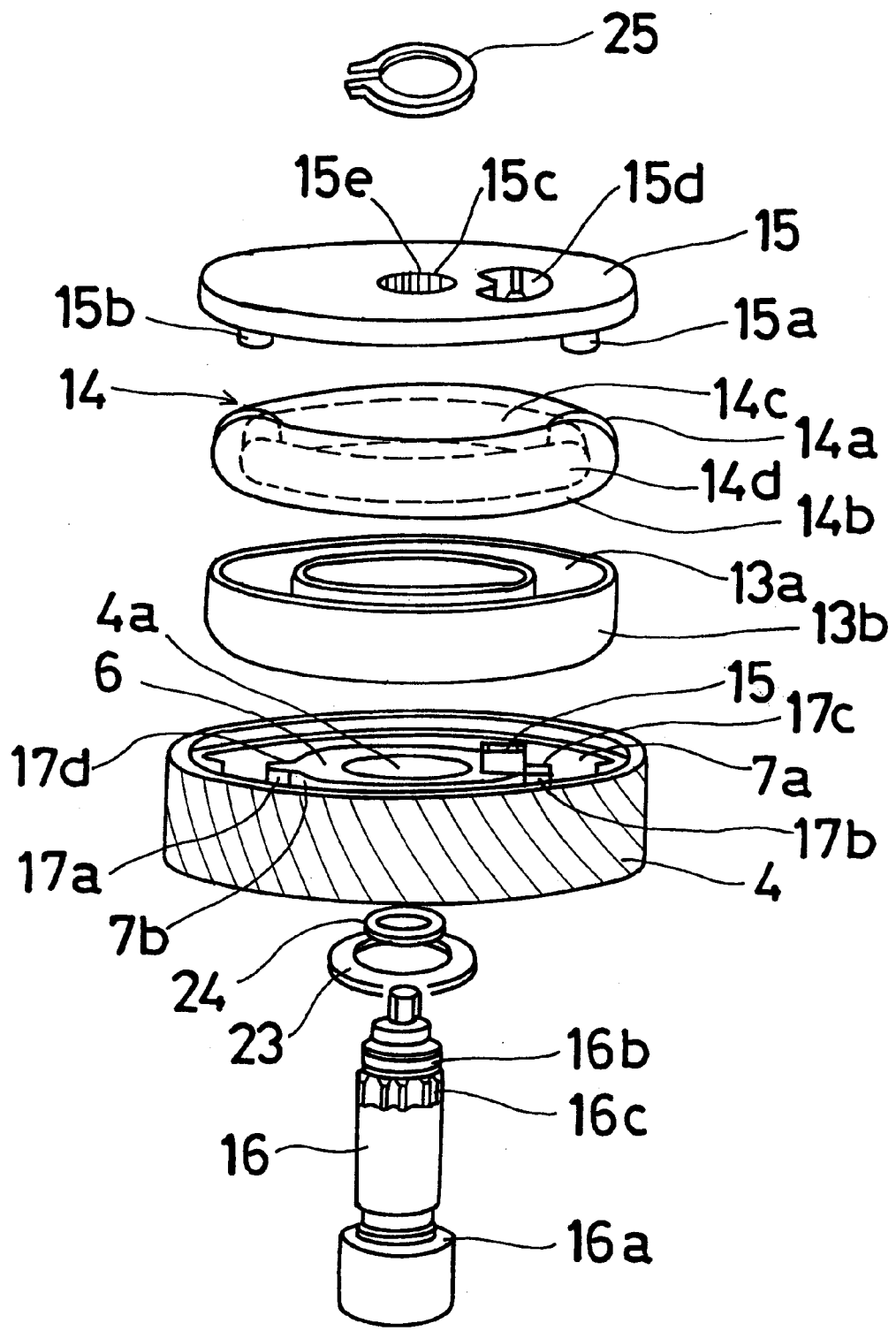
FIG. 3 is an exploded view of the buffer mechanism in FIG. 1.

This buffer mechanism will be explained below with reference to the drawings. As shown in FIG. 1, the motor 2 and the buffer mechanism are attached to a housing 3. Electricity is fed to the motor 2 from the outside by a connector 40 via a harness 41. The motor unit 1 which is a driving source of the window regulator 20 is provided in a body with the door panel 22 and the buffer mechanism described below is interposed between the motor unit 1 and the window regulator 20. Referring also to FIG. 3, the buffer mechanism is provided within a worm wheel 4 for transmitting rotation of the motor unit 1 to the window regulator 20 and comprises mainly the worm wheel 4, elastic members 14, a tension plate (plate member) 15 and an output shaft 16. A worm 5 is provided around the rotary shaft of the motor 2 by press-fitting it to a body or with a body, as shown in FIG. 2. The worm wheel 4 engages with the worm 5 and turns in synchronism with the motion of the worm 5. The worm wheel 4 is made of resin such as polyamide PA, polyacetal POM or the like.

Two grooves 7a and 7b having almost an U-shaped section in the radial direction are provided within the worm wheel 4 and spaces 8a and 8b which have almost a rectangular section in the radial direction and whose diameter is smaller than that of the grooves 7a and 7b are created so as to connect the two grooves 7a and 7b. A terminal section 19, in which a terminal (not shown) for detecting changes of rotation of the worm wheel 4 is projected by an urging member (not shown) in the left direction in FIG. 2, is provided between a boss section 6 provided at the center of the worm wheel 4 and the space 8b. A hole 4a through which the output shaft 16 penetrates is created through the boss section 6.

Two liners 13a and 13b having almost an U-shaped section and made of metal, such as stainless steel, or reinforced plastic are fitted into the grooves 7a and 7b, respectively, and the elastic members 14 are disposed within the liners 13a and 13b. The elastic members 14 are composed of coil springs 14a and 14b and rubbers 14c and 14d. They are stored in the liners 13a and 13b, respectively, such that the rubber 14c made of NBR, SBRF, NR or the like is disposed within the coil spring 14a and the rubber 14d, of a similar material, is disposed within the coil spring 14b in the same manner. The length of the rubbers 14c and 14d is set to be shorter than the length of the coil springs 14a and 14b and is shown as $1_c$ and $1_d$, respectively, between the arrows extending from the ends of the rubbers 14c and 14d in FIG. 1, in the state when they are stored in the liners 13a and 13b. The tension plate (plate member) 15 is disposed facing these elastic members 14. The interposition of the liners 13a and 13b between the coil springs 14a and 14b and the worm wheel 4 prevents the wear of the worm wheel 4 which might otherwise be caused by the coil springs 14a and 14b and prevents inferior sliding of the coil springs 14a and 14b and abnormal sound which might otherwise be caused between the coil springs 14a and 14b and the worm wheel 4 when the tension plate 15 moves differentially from the worm wheel 4, i.e., when the coil springs 14a and 14b are compressed/released.

The tension plate 15 is provided with inner teeth 15c through which the output shaft 16 is inserted at the center part thereof. The tension plate 15 is also provided with a hole 15d, preferably arc-shaped, through which the terminal provided in the terminal section 19 in the radial direction passes through and two claws 15a and 15b at the under side thereof as shown in FIG. 3 (on the side of the spaces 8a and 8b).

A method of how to assemble the above-mentioned buffer mechanism will now be explained with reference to FIG. 3, in which the housing 3 is omitted for clarity. At first, the worm wheel 4 is stored within the housing 3. Next, the liners 13a and 13b are fitted respectively into the grooves 7a and 7b provided within the worm wheel 4. The rubber 14c is inserted through the coil spring 14a and the rubber 14d is inserted through the coil spring 14b in the same manner. Then, the coil springs 14a and 14b are compressed and assembled into the grooves 7a and 7b. In the assembled state within the worm wheel 4, while the rubbers 14c and 14d are disposed within the coil springs 14a and 14b as described above, although both ends of the coil springs abut respectively with walls 17a–17d separating the grooves 7a and 7b and the motion of the rubbers 14c and 14d is restricted in the radial direction within the coil springs 14a and 14b by the walls 17a–17d (the rubbers 14c and 14d have the length of the range indicated by the arrows in FIG. 1), the rubbers can move within the coil springs 14a and 14b. The coil springs 14a and 14b and the rubbers 14c and 14d may be provided in series or in parallel with respect to the direction of rotation of the worm wheel 4. The use of the coil springs 14a and 14b having a circular arc shape allows them to be assembled more favorably than straight coil springs and to be in face-to-face contact with the liners 13a and 13b disposed within the worm wheel 4. It is noted that the reaction characteristic of the coil springs 14a and 14b is linear.

The tension plate 15 created by press-molding a metal plate which has been treated in hot or cold or made of a sintered metal is put on the above-mentioned elastic members 14 in a facing relationship therewith. When the tension plate 15 is put on the worm wheel 4 in the facing relationship, the two claws 15a and 15b are positioned within the spaces 8a and 8b. In the thus assembled state, the output shaft 16 is inserted through the hole 4a of the worm wheel 4 and a hole 15e of the tension plate 15. The output shaft has a washer 23 and an O-ring 24 fitted at a stepped portion 16a at the under side thereof as shown in FIG. 3 prior to insertion through hole 4a. Then, a C-ring 25 is fitted to a stepped portion 16b at the upper side of the shaft. The output shaft 16 is provided with a serration 16c at the outer periphery thereof. Although the serration 16c is provided in the illustrated embodiment, the outer periphery may be formed into a rectangular shape having flat sides. The output shaft 16 is assembled with the tension plate 15 so that the serration 16c engages with the inner teeth 15c of the tension plate 15 and so that the output shaft 16 rotates in a body with the tension plate 15. It is noted that the output shaft 16 is linked also to the window regulator 20 and the window regulator 20 is actuated when the output shaft 16 turns.

Next, the operation for moving up/down the window glass 30 will be explained. When the motor 2 turns in one direction so as to move up/down the window glass 30, the worm 5 turns the worm wheel 4. At this time, when the load is light, one end of each of the coil springs 14a and 14b disposed within the worm wheel 4 is anchored either by the walls 17a and 17c or by the walls 17b and 17d (depending on the direction of rotation) and the other end of each coil spring presses the claws 15a and 15b, thus turning the tension plate 15. At this time, the flex of the coil springs 14a and 14b is small and the rubbers 14c and 14d are not compressed, so that the tension plate 15 turns in a body with the output shaft 16 when the tension plate 15 turns because it is engaged with the output shaft 16 via the inner teeth 15c. Therefore, the window regulator 20 linked to the output shaft 16 performs the upward/downward action, moving the window glass 30 up/down.

Next, a case when pinch has occurred will be explained. When a person's hand or an object is pinched between the window glass 30 and the door frame 31 and the load of the motor 2 increases while the window glass 30 is moving up, the output shaft 16 is stopped, though the motor 2 may still continue to rotate. Even when the output shaft 16 stops turning, a differential motion occurs between the tension plate 15 and the worm wheel 4 by the action of the elastic members 14 within the worm wheel 4 and the worm 5 continues to turn. For instance, assuming that the worm wheel 4 turns clockwise as shown in FIG. 3 in moving up the window glass 30, the worm wheel 4 flexes the elastic members 14 against the walls 17b and 17d of the worm wheel 4 when it turns clockwise. That is, in the initial period of the pinch, it flexes the coil springs 14a and 14b due to the claws 15a and 15b of the tension plate 15, which has stopped turning, anchoring one end of each of the coil springs 14a and 14b with the walls 17b and 17d, respectively. Thereafter, the worm 5 provided on the motor 2 and the worm wheel 4 engaged therewith continue to turn and relative rotation is caused between the worm wheel 4 and the output shaft 16 because the rubbers 14c and 14d are compressed after moving up to the walls 17b and 17d in the vicinity of the position approximately corresponding to where the coil springs 14a and 14b are completely flexed while the output shaft 16 is stopping. At this time, because the coil springs 14a and 14b flex at first and then the rubbers 14c and 14d are compressed thereafter in addition thereto, the coil springs 14a and 14b and the rubbers 14c and 14d function as buffer members when pinch occurs. Therefore, because the coil springs 14a and 14b and the rubbers 14c and 14d absorb the turning force of the motor while assisting each other, the load may be shared efficiently. Then, the characteristic of the stress applied to the tooth surface where the worm 5 engages with the worm wheel 4 may be changed at the point of time when the compression of the rubbers 14c and 14d is added to the flex of the coil springs 14a and 14b. When the worm wheel 4 is made of resin, it is possible to suppress the worm wheel from deforming due to a creeping phenomenon and the worm 5 and the worm wheel 4 from biting when the motor locking torque is released.

At this time, the rubbers 14c and 14d may be compressed even though the output of the motor 2 is maximum, such that the rubbers 14c and 14d become sufficient buffer members due to the damper function of the rubbers 14c and 14d. In the present apparatus, the coil springs 14a and 14b having a linear characteristic are thus used in a region of motor torque used in connection with pinch preventing control and the rubbers 14c and 14d having a non-linear characteristic are used in addition thereto in a region of motor torque in which the tooth surface where the worm 5 and the worm wheel 4 engage may cause the creep fracture.

It is noted that a function for moving down the window glass 30 to a predetermined position by the terminal provided in the terminal section 19 detecting that pinch has occurred and by immediately reversing the motor 2 may be added in the arrangement described above.

As described above, according to the present invention, the motor unit is fitted with a buffer mechanism comprising a worm provided around the rotary shaft of the motor; a worm wheel which engages with the worm; an output shaft for transmitting a turning force of the motor to the outside; a plate member which rotates in a body with the output shaft; and elastic members disposed between the plate member and the worm wheel. The elastic members flex and cause the relative rotation between the output shaft and the worm wheel when the output shaft stops turning while the motor is still operative. The elastic members include springs and rubbers, with the springs and rubbers being provided in series or in parallel with respect to the direction of rotation of the worm wheel.

By constructing a buffer mechanism as described above, the springs and rubbers absorb the turning force of the motor while causing the relative rotation between the output shaft and the worm wheel; the springs and rubbers may be provided in series or in parallel with respect to the direction of rotation of the worm wheel and in order to function as sufficient buffer members when the output shaft of the motor stops while the motor is operative (i.e., when pinch occurs or when the motor is locked).

When coil springs are adopted as the springs and provided within the worm wheel, the rubbers are disposed within the coil springs and the coil springs and rubbers are disposed within the grooves created within the worm wheel. The coil springs and rubbers may thus be accommodated within the worm wheel, so that the buffer mechanism requires only the size of the worm wheel and is thus advantageous space-wise.

The turning force of the motor may be absorbed only by the coil springs when the load of the motor is light at the time when pinch occurs by setting the length of the rubber to be shorter than the length of the coil spring disposed within the worm wheel. Thereafter, the turning force of the motor is additionally absorbed by the compressive force of the rubbers as the load increases.

The load may be shared efficiently by the coil springs and rubbers and the stress to the tooth surface may be changed at the point of time of changing over from the flex of the coil spring to the compression of the coil spring plus the rubber by arranging such that the rubber starts to be compressed in the vicinity of position when the coil spring is thoroughly flexed and the output shaft stops turning.

The rubber can still absorb the output of the motor and, thus function as a sufficient buffer member, by arranging the rubber such that it is compressible even when the output of the motor is maximum.

The coil spring may be favorably assembled and provides stable performance when flexed by using the circular arc coil spring as the coil spring.

While the preferred embodiments have been described, variations thereto will occur to those skilled in the art within the scope of the present inventive concepts which are delineated by the following claims.

What is claimed is:

1. A motor unit fitted with a buffer mechanism functioning as a pinch detector, comprising:
   a worm provided around a rotary shaft of a motor;
   a worm wheel which engages with said worm;
   an output shaft for transmitting a turning force of said motor to an external device;
   a plate member which turns with said output shaft; and
   elastic members disposed between said plate member and said worm wheel, said elastic members comprising at least two sets of springs and rubber elements disposed in the worm wheel;
   said elastic members flexing and causing relative rotation between said output shaft and said worm wheel when said output shaft stops turning due to the occurrence of a pinch condition while said motor is operative.

2. The motor unit fitted with the buffer mechanism according to claim 1, wherein said springs are coil springs provided within said worm wheel, said rubber elements are disposed within said coil springs, and said coil springs and rubber elements are disposed within grooves within said worm wheel.

3. The motor unit fitted with the buffer mechanism according to claim 2, wherein a length of one said rubber elements is shorter than a length of said respective coil spring disposed within said worm wheel.

4. The motor unit fitted with the buffer mechanism according to claim 3, wherein said rubber element starts to be compressed approximately when said coil spring is thoroughly flexed and said output shaft stops turning.

5. The motor unit fitted with the buffer mechanism according to claim 4, wherein said rubber element is compressible even when an output of said motor is maximum.

6. The motor unit fitted with the buffer mechanism according to claim 5, wherein a circular arc coil spring is used as said coil spring.

7. A buffer mechanism forming a pinch detector for a motor unit comprising a worm disposed around a rotary shaft of a motor, a worm wheel for engagement with said worm, an output shaft for transmitting a turning force of the motor to an external device, and a plate member which turns with said output shaft, said buffer mechanism comprising:
   a plurality of elastic members for use between the plate member and the worm wheel, said elastic members comprising at least two springs and at least two rubber elements, with the turning force of the motor being absorbed by the at least springs and the at least two rubber elements when the output shaft stops turning due to the occurrence of a pinch condition.

8. A buffer mechanism according to claim 7, wherein said elastic members flex and define a means for causing relative rotation between the output shaft and the worm wheel when the output shaft stops turning while the motor is operative.

9. A buffer mechanism according to claim 7, wherein said elastic members are provided in series or in parallel with respect to a direction of rotation of the worm wheel.

10. A buffer mechanism according to claim 7, wherein said springs include coil springs and said rubber elements are disposed within a respective said coil spring.

11. A buffer mechanism according to claim 10, wherein a length of one said rubber elements is shorter than a length of said respective coil spring.

12. A window moving mechanism for moving a window within a window frame and for stopping movement of the window when an object is pinched between the window and the window frame, comprising:
   a motor having a rotary shaft provided with a worm;
   a worm wheel engaging said worm;
   an output shaft for transmitting a turning force of said motor to a window regulator to move the window;
   a plate member which turns with said output shaft; and
   elastic members disposed between said plate member and said worm wheel for flexing and causing relative rotation between said output shaft and said worm wheel when said output shaft stops turning when an object is pinched between the window and the window frame while said motor is operative, said elastic members comprising at least two springs and at least two rubber elements.

13. The window moving mechanism according to claim 12, wherein said springs are coil springs disposed within said worm wheel, one of said rubber elements being disposed within each of said coil springs.

14. The window moving mechanism according to claim 12, wherein each of said rubber elements is disposed within a respective one of said springs, each rubber element being shorter than the respective spring.

15. The window moving mechanism according to claim 12, wherein said springs are circular arc coil springs.

16. The window moving mechanism according to claim 12, wherein said elastic members are provided in series or in parallel with respect to a direction of rotation of the worm wheel.

* * * * *